United States Patent
Savage et al.

(10) Patent No.: US 7,936,667 B2
(45) Date of Patent: May 3, 2011

(54) BUILDING BACKUP TUNNELS FOR FAST REROUTE IN COMMUNICATIONS NETWORKS

(75) Inventors: Donnie Savage, Raleigh, NC (US); Alvaro Retana, Raleigh, NC (US); Russ White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 12/319,298

(22) Filed: Jan. 5, 2009

(65) Prior Publication Data

US 2010/0172237 A1 Jul. 8, 2010

(51) Int. Cl.
*H04L 12/28* (2006.01)
*H04L 12/56* (2006.01)
*G06F 15/173* (2006.01)

(52) U.S. Cl. ......... 370/228; 370/229; 370/238; 709/238

(58) Field of Classification Search .......... 370/216–230, 370/235, 238, 241–252, 351, 389–392; 709/230–244
See application file for complete search history.

(56) References Cited

U.S. PATENT DOCUMENTS

| | | | |
|---|---|---|---|
| 6,256,295 B1 * | 7/2001 | Callon | 370/254 |
| 6,363,319 B1 * | 3/2002 | Hsu | 701/202 |
| 6,728,205 B1 * | 4/2004 | Finn et al. | 370/217 |
| 6,751,746 B1 * | 6/2004 | Jain et al. | 714/4 |
| 7,707,307 B2 * | 4/2010 | Miles et al. | 709/239 |
| 2006/0187819 A1 | 8/2006 | Bryant et al. | |
| 2008/0074997 A1 | 3/2008 | Bryant et al. | |
| 2009/0252033 A1 * | 10/2009 | Ramakrishnan et al. | 370/228 |

* cited by examiner

*Primary Examiner* — Tri H Phan (74) *Attorney, Agent, or Firm* — Cindy Kaplan (57) ABSTRACT

In one embodiment, a method includes identifying at a node, a destination for which a primary path is defined between the node and the destination, transmitting a request message to a neighbor node for routing information for a backup path between the node and the destination, receiving a reply message containing an address identifying the backup path, and building a backup tunnel to the address. The request message includes at least one node identified as a node to be avoided in the backup path and a request cost. An apparatus for building backup tunnels is also disclosed.

20 Claims, 8 Drawing Sheets

BUILDING BACKUP TUNNELS FOR FAST REROUTE IN COMMUNICATIONS NETWORKS

BACKGROUND OF THE INVENTION

The present disclosure relates generally to communications networks, and more particularly, to building a backup tunnel for forwarding data following a failure in the communications network.

Following a network failure (e.g., link or node failure), a node adjacent to the failure will attempt to find an alternate path to a destination. However, this requires time and may cause the node to drop packets being routed to the destination while the network converges. There are many applications which require a non-looping mechanism to route around a network failure and drop a minimal number of packets while the network is converging. Fast reroute techniques have been developed to assure rapid recovery in the event of a network failure. Fast reroute requires a node to compute a backup tunnel (path) around a possible failure. When a failure is detected, the node forwards subsequent packets which otherwise would have traversed the failure, via the backup tunnel. Traffic flowing through a failed link or node is thus rerouted through one or more preconfigured backup tunnels through the use of fast reroute. Redirection of the impacted traffic occurs very quickly to minimize impact on the user experience.

As described above, fast reroute requires identification of a backup path, however, there is not always an indication of which neighbor nodes should not be used in the backup path. In some fast reroute processes, a node must wait to receive advertisements and create a map of the network topology before constructing a backup tunnel.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises identifying at a node, a destination for which a primary path is defined between the node and the destination, transmitting a request message to a neighbor node for routing information for a backup path between the node and the destination, receiving a reply message comprising an address identifying the backup path, and building a backup tunnel to the address. The request message comprising at least one node identified as a node to be avoided in the backup path and a request cost.

In another embodiment, an apparatus generally comprises a processor configured to identify a destination for which a primary path is defined between the apparatus and the destination, transmit a request message to a neighbor node for routing information for a backup path between the node and the destination, process a reply message comprising an address identifying the backup path, and build a backup tunnel to the address. The request message comprises at least one node identified as a node to be avoided in the backup path and a request cost. The apparatus further comprises memory for storing said primary path and said backup path.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The embodiments described herein provide a network node with the ability to tunnel traffic around a network failure upon detection of a failure, until the network converges around the failure, if a path around the failure exists. The embodiments operate to retrieve a minimal amount of information needed to identify tunnel endpoints and fast reroute paths which will be used to forward traffic loop-free through a network in the event of a failure. Thus, there is no need to wait for advertisements or construct a map of the entire network topology, as is done with link state protocols. Also, the embodiments described herein do not require extra addressing, such as repair addresses.

In one embodiment, a distance vector routing protocol such as EIGRP (Enhanced Interior Gateway Routing Protocol) provides network information used to identify tunnel endpoints which will forward traffic in the event of a failure in a primary path. EIGRP uses distance vector routing technology so that each router need not know all the router's link relationships with the entire network. Each router advertises destinations with a corresponding distance and upon receiving the information adjusts the distance and propagates it to neighboring routers. EIGRP sends only summary information from each intermediate node within the network. The summary information includes a measure of cost (cost metric) to reach a destination node from the intermediate node (e.g., router) providing the summary information. A router receives routing information from each neighbor router with which the router shares a direct communications link. The receiving router then determines the route (i.e., best next hop or path) based on the cost metrics reported by all the neighbors and the costs to traverse the link to reach each of those neighbors.

Each router maintains state information about adjacent neighbors. When newly discovered neighbors are learned, the address and interface of the neighbor is recorded and stored in a neighbor table. A topology table contains all destinations identified by neighboring routers. Associated with each entry in the topology table, is a destination address and a list of neighbors that have advertised the destination. A topology table entry for a destination can have one of two states. A route is considered in the passive state when a router is not per-forming a route recomputation. A route is in active state when the route is undergoing a route recomputation.

EIGRP builds the topology table from each of its neighbor's advertisements, and converges by either looking for a likely loop-free route in the topology table, or, if it knows of no other route, by querying its neighbors. A loop-free path from a particular router is one in which the next hop goes to a router that is not farther from the destination than the particular router itself. If the next hop goes to a farther router, subsequent hops are likely to come back to the particular router, thus, forming a loop.

In EIGRP, the neighbor router that is the next best hop to a particular destination address is the successor for that destination address. A successor for a particular destination provides the least distance to that destination and is guaranteed not to be part of a routing loop. EIGRP also records in storage any alternative neighbor router (referred to as a feasible successor) through which a path is sure to be loop-free. For a reachable destination there is at least one successor, however, there may not be any feasible successors.

In one embodiment, EIGRP's DUAL (Diffusing Update Algorithm) is used to provide information used in identifying backup tunnel endpoints.

It is to be understood that EIGRP and DUAL are provided only as examples, and that other protocols or cost metrics may be used without departing from the scope of the invention. For example, any distance vector routing protocol that identifies adjacent network addresses, selects paths based on a cost metric, or that predetermines loop-free possible alternatives (e.g., feasible successors in EIGRP) for current best next hop (e.g., successor in EIGRP) based on cost metrics, may be used.

As previously described, EIGRP provides several techniques for enhanced recovery from node and link failures in a communications network by predetermining some parameters, such as feasible successors, used for quickly determining new paths through the network. During recovery, however, some data packets formerly forwarded through a failed link or node are lost until the network converges on new paths that utilize the remaining links and nodes. When a router loses a route to a particular destination, a feasible successor is immediately used to forward data packets to that destination. If the router does not have a record in storage for a feasible successor, the router sends a query to each neighbor, asking for the neighbor's routes and costs to the particular destination. As the responses are received, the routes (best next hops) are re-computed. As the responses begin to reflect a settled arrangement of nodes and links, the re-computed routes converge on a set of routes. This recovery process takes from several milliseconds to several seconds, even up to a minute or more for large networks. In the meantime, data packets directed to that destination may be dropped. As described below, embodiments presented herein provide a process for defining fast reroute paths to be used until the network converges.

Figure 1:
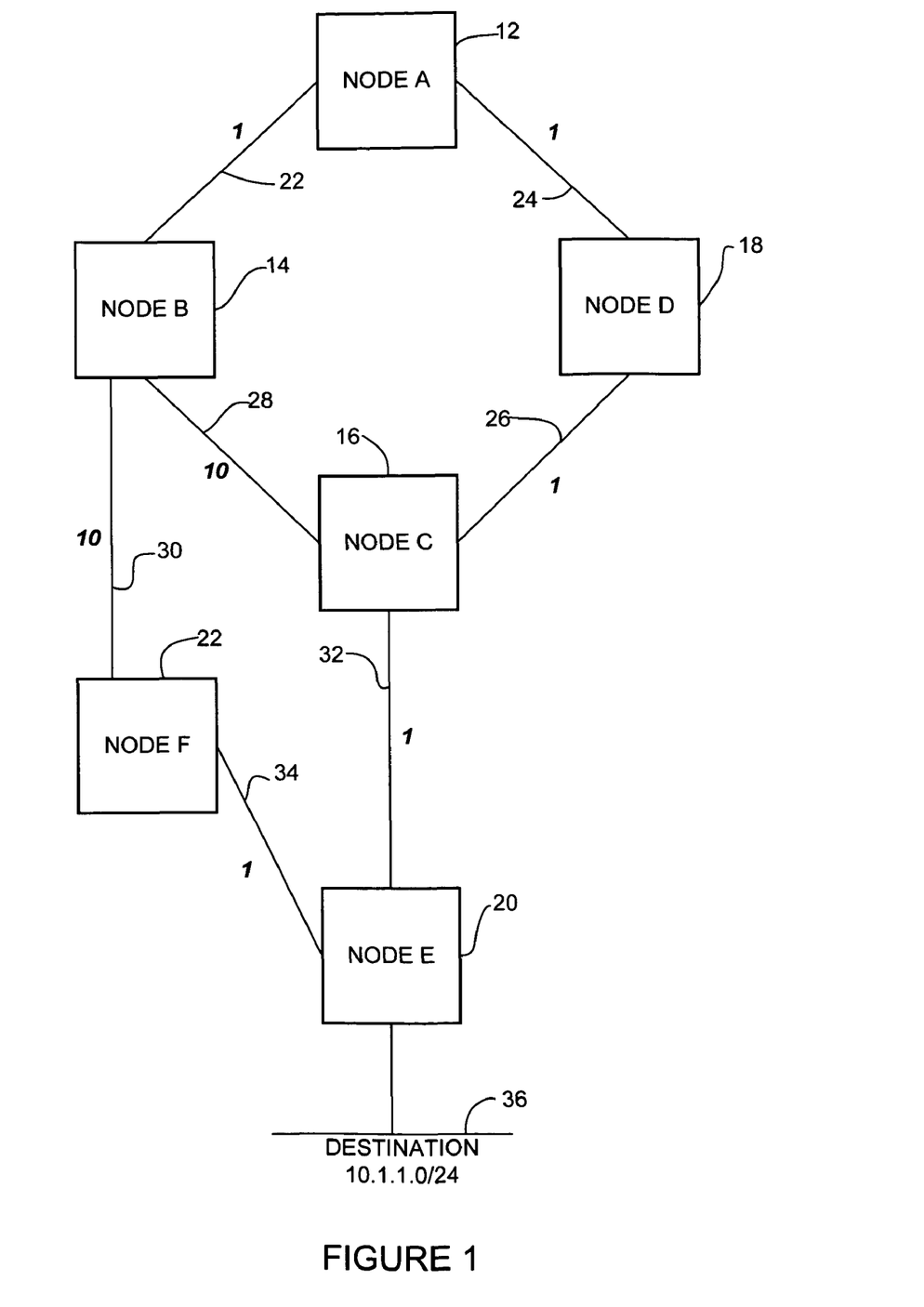
FIG. 1 illustrates a network in which embodiments described herein may be implemented.

Referring now to the drawings, and first to FIG. 1, an example of a network that may implement embodiments described herein is shown. For simplification, only a small number of nodes are shown. The system operates in the context of a data communication network including multiple network elements. Some of the elements in a network that employs the system may be network devices such as routers, switches, gateways, or servers. The network device may include, for example, a master central processing unit (CPU), interfaces, and a bus. The CPU preferably includes memory and a processor. The network device may be implemented on a general purpose network machine such as described below with respect to FIG. 5.

The network includes a plurality of nodes (e.g., routers or other network devices) for forwarding data. Node A (12) is connected to node B (14) via link 22 and to node D (18) via link 24. Node B is connected to node C (16) via link 28 and node F (22) via link 30. Node C is connected to node D via link 26 and node E (20) via link 32. Node E is connected to node F via link 34. The destination (e.g., IP network address 10.1.1.0/24) 36 is reachable through node E. At least some of the nodes (e.g., routers) in the network are configured for fast reroute operation as described below.

Also shown in FIG. 1 is a cost metric value associated with each link. Cost is given in arbitrary units. Links 22, 24, 26, 32, and 34 all have a cost value of 1. Links 28 and 30 have a cost value of 10. Metrics of cost to traverse links in a network are well known in the art. Any method known in the art may be used to determine a cost metric value for a link.

While a certain number of nodes and links are depicted in the network for purposes of illustration, other networks may include the same, fewer, or more nodes, such as routers or other network devices, with associated links, with various costs.

Node's A best path to destination 36 is through node D since the cost on path node A→node D→node C→node E is 3 and the cost on path node A→node B→node C→node E or path node A→node B→node F→node E is 12. Node D is thus referred to as node A's successor. Node B's best path is through node A (cost of 4 on path to node E). Thus, node A is node B's successor. Node B also has two feasible successors; node C and node F. Node C's best path is through node E (cost of 1). Node D's best path is through node C (cost of 2). Node E's best path is directly connected to the destination 36.

The embodiments described herein utilize an "avoid list" contained within a routing message to identify which nodes should be avoided in building a backup path for use in fast reroute. Routers which receive a routing update with their local router ID within the avoid list ignore or drop the routing update. The term "avoided node" as used herein refers to a node which an indicated path should avoid. The term "request cost" as used herein, refers to a cost to a destination node, as reported by the avoided node. Both the avoided node and request cost are transmitted in a request message sent to a neighbor node in an attempt to identify an alternate path to a destination. These terms will be described further below with reference to illustrated examples.

Figure 2A:
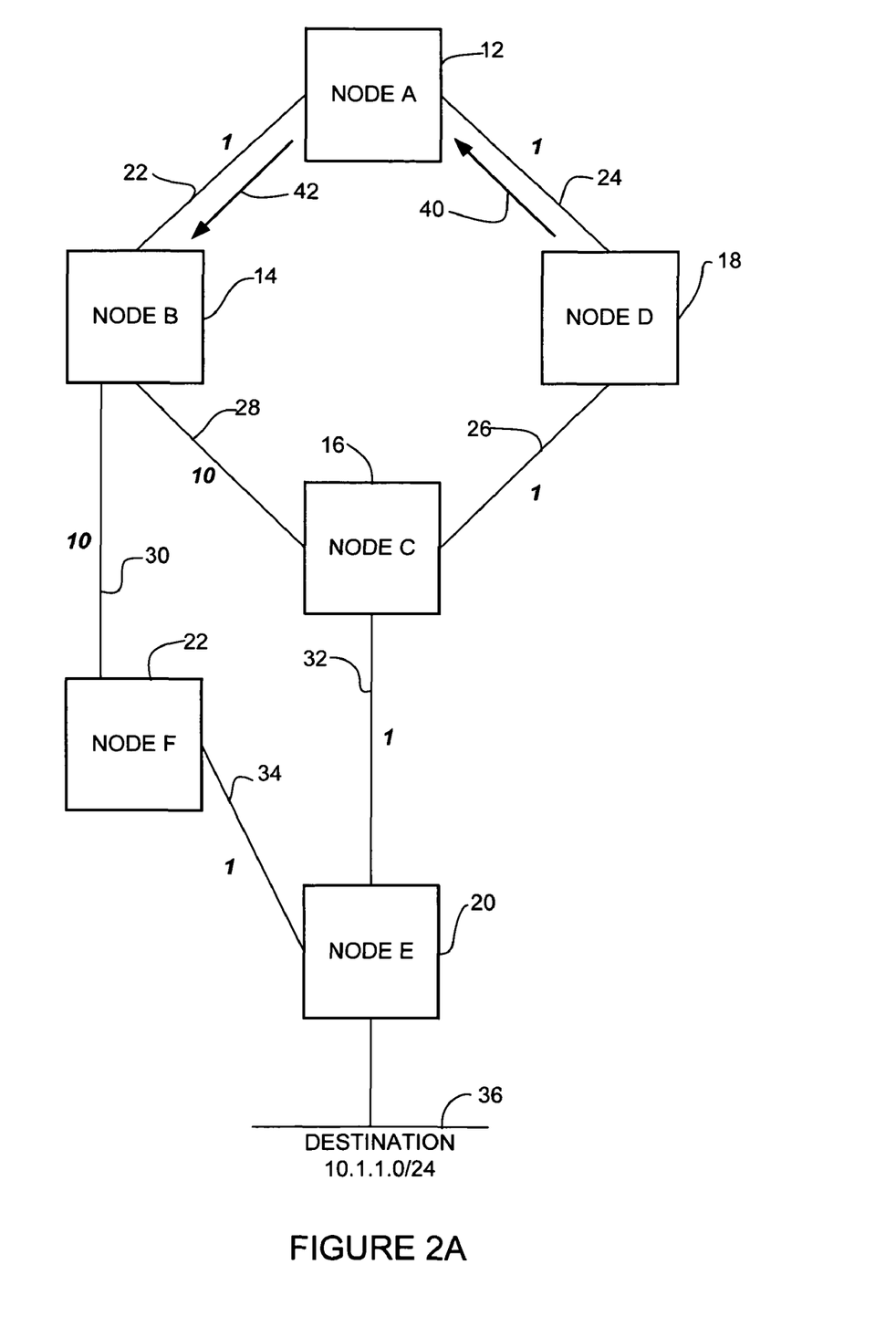
FIGS. 2A-2D illustrate operation of the network of FIG. 1 in requesting an alternate path and building a backup tunnel for fast reroute.

FIGS. 2A-2D illustrate a process for defining a backup path for use in fast reroute in the network shown in FIG. 1. In FIG. 2A, node D transmits a request (indicated at line 40) for routing information to node A. The request message may be transmitted after start up or after a change in topology, for example. The message generated at node D includes an avoid list (containing the nodes to be avoided in the backup path) and a request cost (the cost reported by the avoided node to the destination). In the example of FIG. 2A, node C is an "avoided node", since it is the neighbor used in the primary path to reach the destination. The request message 40 thus includes the router ID for node C in the avoid list and the reported distance from node C to the destination 36 (request cost of one). Upon receiving the request 40, node A attempts to find an alternate path to destination 36. Node A cannot respond to the request because node A's successor (node D) is the router from which the request was received. Node A therefore forwards the request to its other neighbor, node B (indicated at line 42).

Figure 2B:
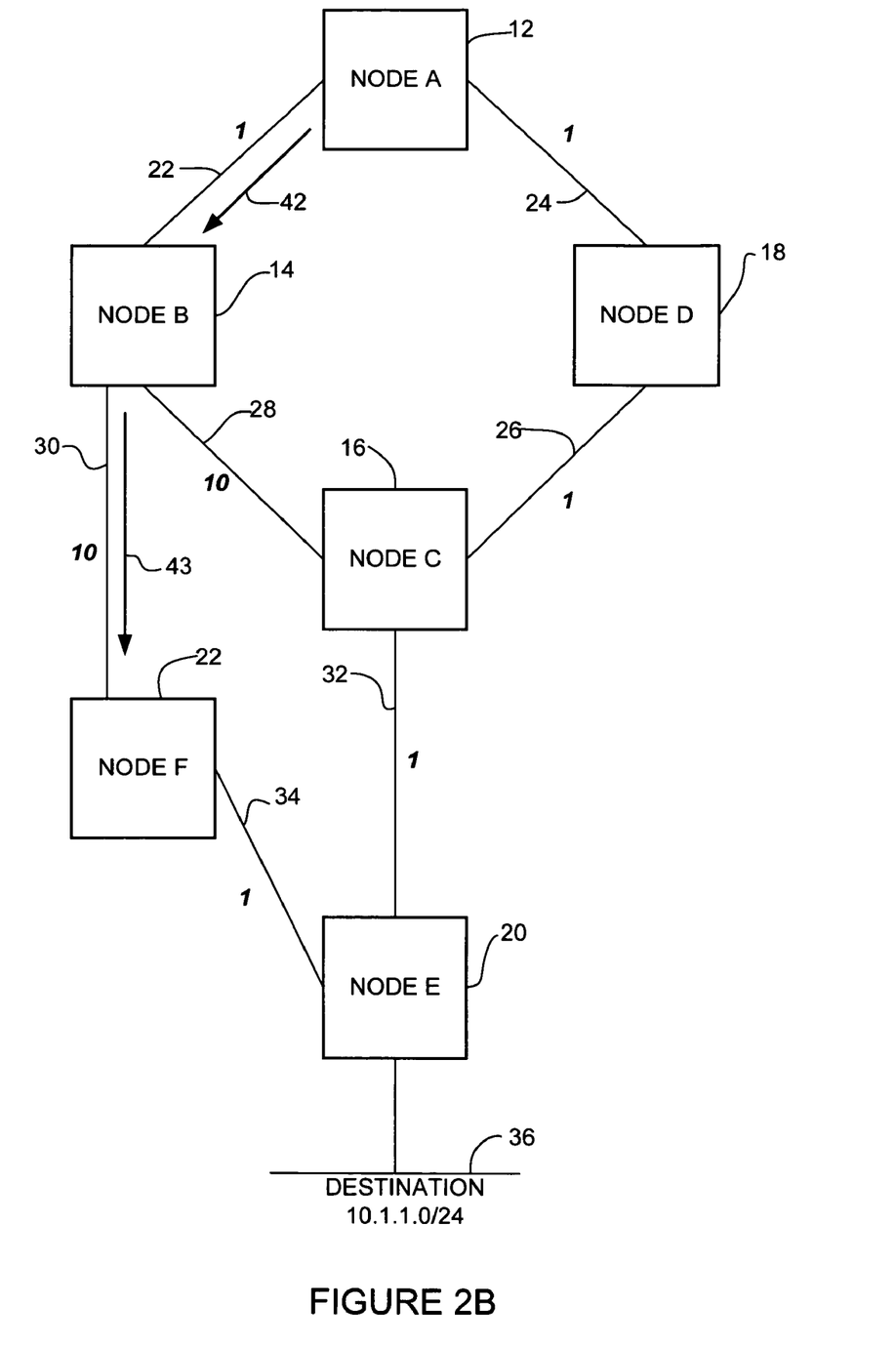

As illustrated in FIG. 2B, node A sends the request to node B (line 42). Node B cannot respond because node B's successor is the router from which it received the request (node A). Node B does not send the request to node C because node C is included in the avoid list. Node B forwards the request to node F (indicated at line 43). Upon receiving the request 43, node F notes that: (a) the message 43 was not received from its successor node (node E); (b) node F's successor node is not in the avoid list; and (c) node F's cost to the destination 36 is equal to one, which is equal to the request cost (cost from avoided node to the destination 36 is one), as reported by node D. Node F therefore determines that the path from node F to the destination is an alternate loop-free path.

Figure 2C:
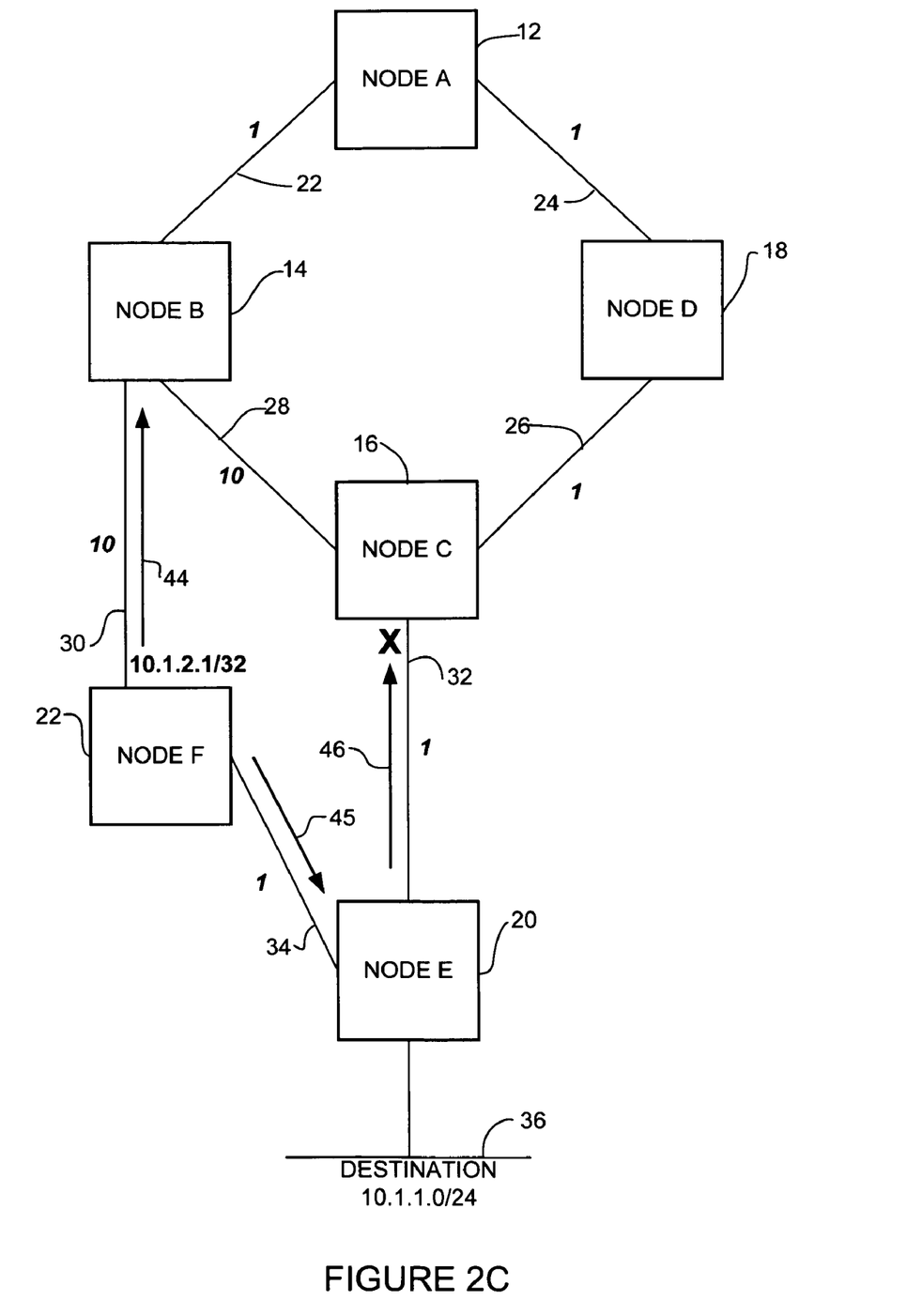
Figure 2D:
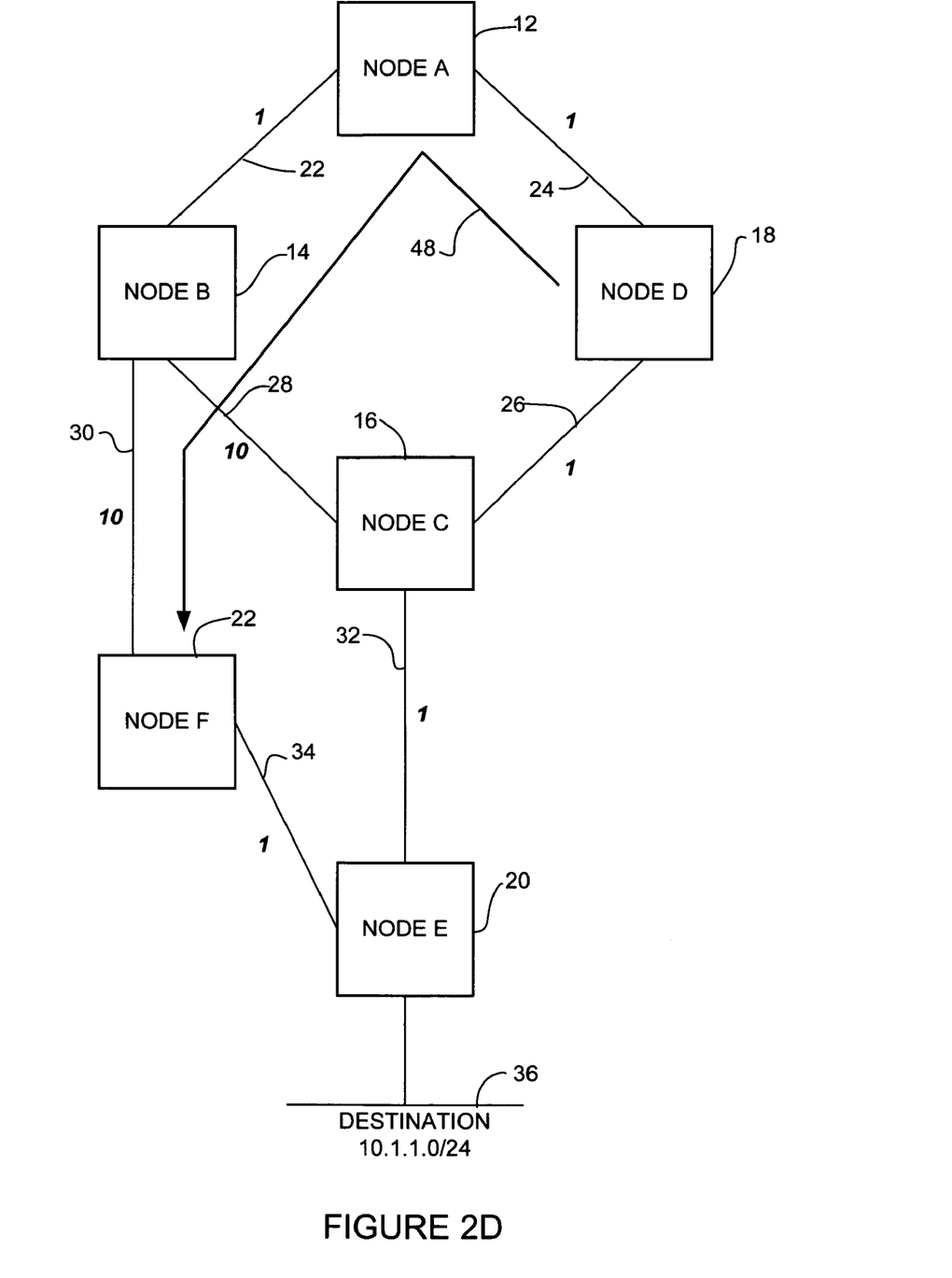

Referring now to FIG. 2C, node F generates a reply message to the request. Node F transmits the reply message (indicated at line 44) containing the address of its interface towards node B (10.1.2.1). Node F also generates a routing advertisement for a new route, which is a host route to the interface towards node B (10.1.2.1/32). The routing advertisement also includes a new avoid list containing node C. Node C receives this new 10.1.2.1/32 route (line 45 from node F to node E and line 46 from node E to node C). Node C examines the avoid list and ignores the route, since its router ID is contained in the avoid list. This prevents node D from learning about this new path from node C.

Node D receives the reply message generated at node F, from node A and builds a backup tunnel to the address indicated in the reply message. The backup tunnel (alternate path) is shown at line 48 in FIG. 2D. If a network failure occurs at node C, node D places the traffic on the backup tunnel (avoid node C tunnel) 48. Node D places the routes learned through node C into active state and attempts to converge the network. When the network converges, node D tears down the tunnel 48.

It should be noted that the term "destination" as used herein may refer to a network, node, or all destinations through a node (e.g., neighbor node). In the case where the destination is all destinations through the neighbor node, the request is for an alternate path to each of the neighbor node's successors, rather than for a destination network or node. Backup tunnels are built around each possible successor. The neighbor node then advertises all routes with its successor in a new field. If the neighbor node fails, the node tunnels around the neighbor node based on the neighbor node's successor in each case. This reduces state to per node, rather than per destination.

The embodiments described herein may be applied to routes with or without feasible successors. In one embodiment, the process is applied only to routes without feasible successors. There may be a manual configuration option which allows network operators to configure a node to apply the process to routes with feasible successors, for example.

Figure 3:
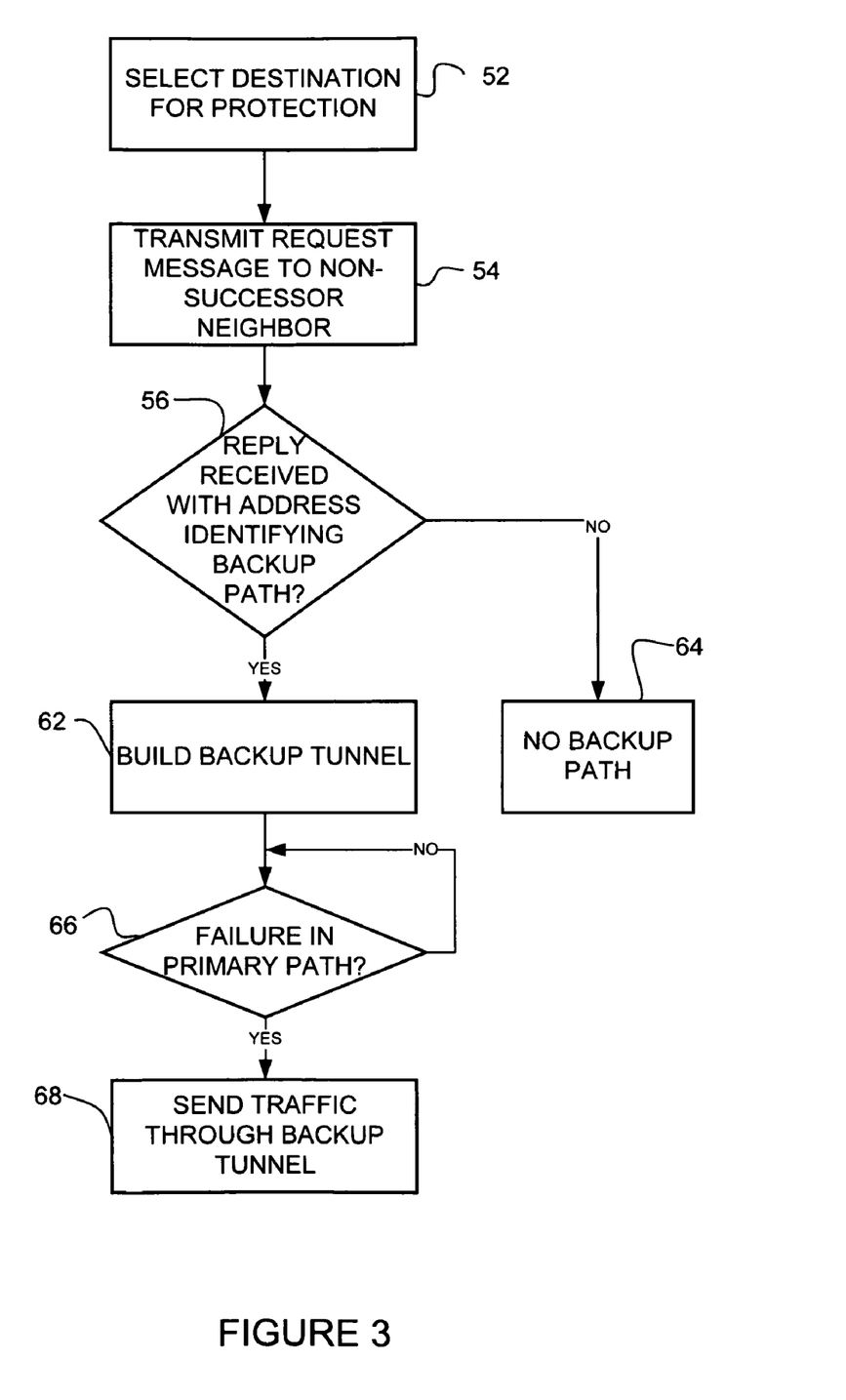
FIG. 3 is a flowchart illustrating a process for requesting an alternate path, building a backup tunnel, and rerouting traffic following a failure.

FIG. 3 is a flowchart illustrating a process for requesting an alternate path, building a backup tunnel, and rerouting traffic following a failure. At step 52 a destination is chosen for protection. A node (e.g., EIGRP router) may examine its local topology table to identify a destination for which a primary path is defined between the node and destination and a backup path is needed. The router then transmits a request message to its non-successor neighbors for routing information for a backup path (step 54). The request message contains the avoided node list and the request cost (described above). If an alternate path does not exist, the router will receive a negative reply from its neighbor node (steps 56 and 64). For example, if the neighbor node does not meet the criteria for a backup path (described below with respect to FIG. 4), and has no other neighbor nodes, the node will send a reply stating that it has no alternate path. The router may also determine that no backup path exists if no reply is received within a specified period of time, for example.

If a backup path exists, the router receives a reply containing an address identifying the backup path. The reply message is generated by a node in the backup path which meets the criteria for a backup path node. This may be a neighbor to the router generating the request message or any other node in a downstream path towards the destination. If a node downstream from the neighbor node generates the reply message, it is forwarded back to the router through the neighbor node. The router builds a backup tunnel to the address identifying the backup path (step 62). In one embodiment, the address indicates the local interface address towards the neighbor through which the request was received (see, for example, FIG. 2C). The address may comprise a node and interface ID or any other identifier that indicates a tunnel endpoint or other location within the backup path. The reply message may also include the destination node and the avoided node, for example. The router may receive a new routing advertisement containing the avoided node's identifier in the avoid list.

If a failure occurs in a primary path (step 66), the router tunnels traffic towards the destination through the backup tunnel identified for routing network traffic around the failure (step 68). The route for the primary path is placed in EIGRP active state, and conventional EIGRP processing eventually discovers a new path to the destination so that the network reconverges as quickly as possible. The backup tunnel is torn down once the network reconverges.

Figure 4:
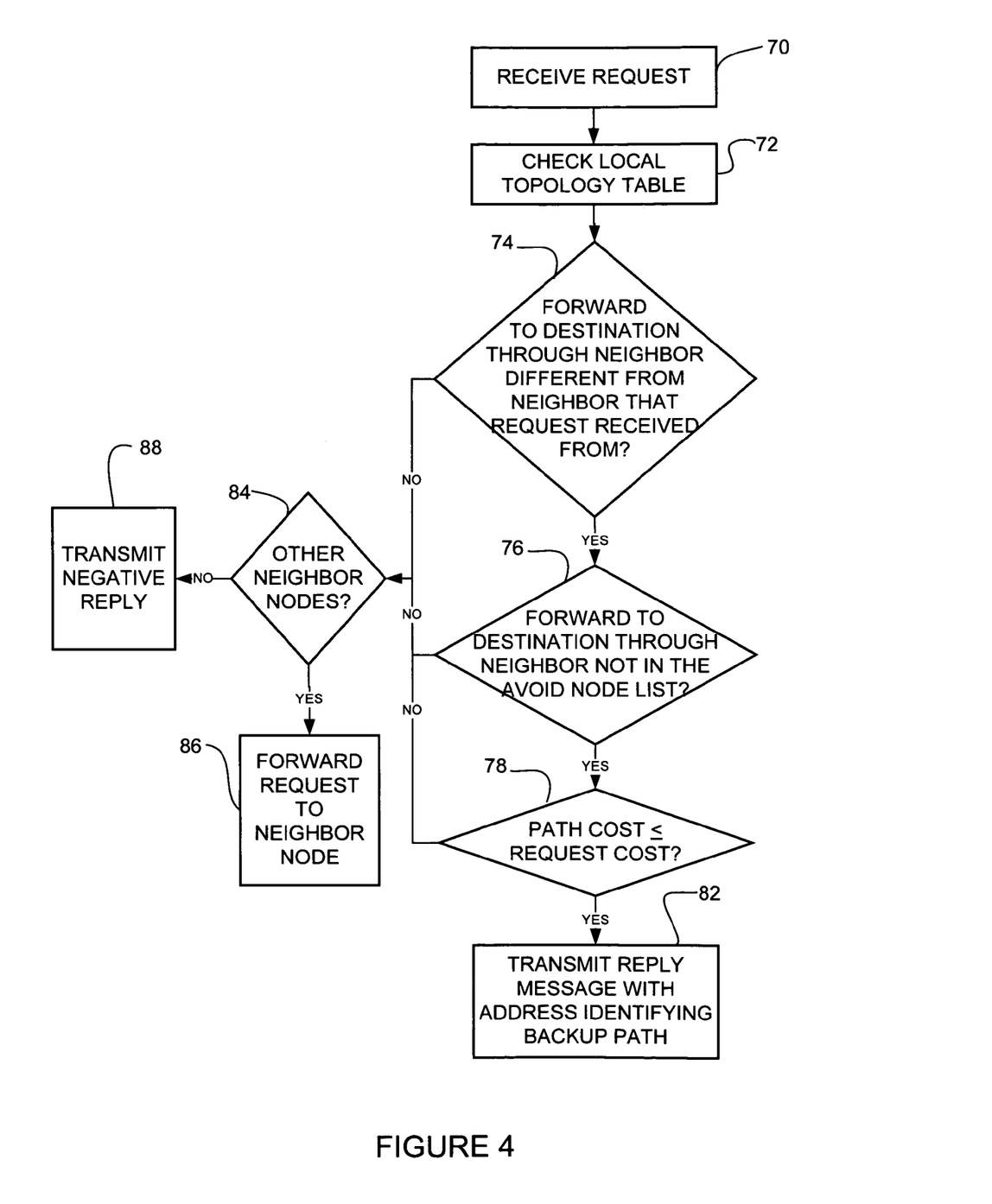
FIG. 4 is a flowchart illustrating a process for responding to the request for an alternate path in the process of FIG. 3.

The flowchart of FIG. 4 illustrates a process performed at a node receiving the request message transmitted in step 54 of FIG. 3. At step 70, the node receives the request message (FIG. 4). As previously discussed, the request message includes the avoided node and the request cost. The router examines its local topology table (step 72) and determines if it would normally forward to the destination through a neighbor node which is not the neighbor node from which it received the request (step 74). If the answer is yes, the router determines if the neighbor through which it would forward is not a node listed in the avoid node list of the request (step 76). If the answer is yes, the router determines if it has a path to the destination which has a cost less than or equal to the request cost (step 78). If the answer is yes, the node generates and transmits a reply message including an address identifying the backup path (step 82). If the answer to steps 74, 76, or 78 is no, the router determines if it has another neighbor node to which it can forward the request (step 84). If the node has another neighbor node, it forwards the request message to its neighbor node (step 86) and the process begins again at step 74. If there are no other local neighbors, the node transmits a negative reply message to the router, stating that there is no alternate path (step 88). In this case, no backup path is defined and no backup tunnel is created.

It is to be understood that one or more of the steps shown in the flowcharts of FIGS. 3 and 4 may be removed, new steps may be added, or the steps may be performed in a different order or in parallel, without departing from the scope of the invention. For example, steps 74, 76, and 78 may be performed in any order or may be performed at the same time.

Figure 5:
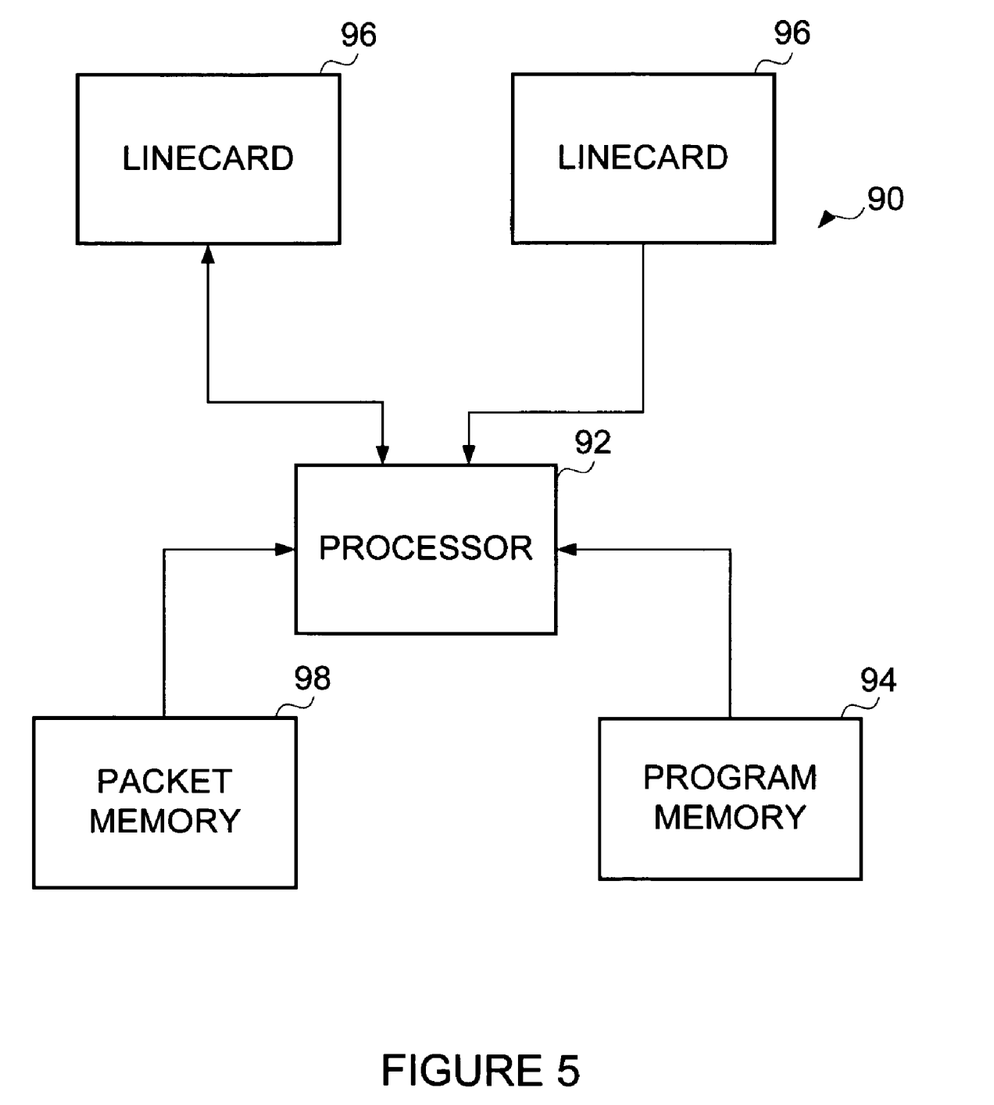
FIG. 5 depicts an example of a network device useful in implementing embodiments described herein.

FIG. 5 depicts a network device 90 that may be used to implement embodiments described herein. Network device 90 is configured to implement all of the network protocols and extensions thereof described above. In one embodiment, network device 90 is a programmable machine that may be implemented in hardware, software, or any combination thereof. Logic may be encoded in one or more tangible media for execution by a processor. For example, processor 92 may execute codes stored in a program memory 94. Program memory 94 is one example of a computer-readable medium. Program memory 94 can be a volatile memory. Another form of computer-readable medium storing the same codes is a type of non-volatile storage such as floppy disks, CD-ROMs, DVD-ROMs, hard disks, flash memory, etc.

Network device 90 interfaces with physical media via a plurality of linecards 96. Linecards 96 may incorporate Ethernet interfaces, DSL interfaces, Gigabit Ethernet interfaces, 10-Gigabit Ethernet interfaces, SONET interfaces, etc. As packets are received, processed, and forwarded by network device 90, they may be stored in a packet memory 98. To implement functionality according to the system, linecards 96 may incorporate processing and memory resources similar to those discussed above in connection with the network device as a whole. It is to be understood that the network device 90 shown in FIG. 5 and described above is only one example and that different configurations of network devices may be used.

As can be observed from the foregoing, the embodiments described herein provide numerous advantages. For example, the embodiments described herein only require a small amount of information for operation and provide loop-free routing through network failures with a high degree of certainty.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   identifying at a node, a destination for which a primary path is defined between the node and the destination;
   transmitting from the node, a request message to a neighbor node for routing information for a backup path between the node and the destination, said request message comprising at least one node identified as a node to be avoided in said backup path and a request cost;
   receiving at the node, a reply message comprising an address identifying said backup path; and
   building a backup tunnel to said address.

2. The method of claim 1 wherein said request message comprises an Enhanced Interior Gateway Routing Protocol (EIGRP) message.

3. The method of claim 1 wherein said address identifies an interface of a node generating said reply message.

4. The method of claim 1 further comprising identifying a failure in said primary path and forwarding network traffic for said destination to said backup tunnel.

5. The method of claim 4 further comprising tearing down said backup tunnel when the network converges.

6. The method of claim 1 wherein the destination comprises all destinations through a neighbor node.

7. The method of claim 6 wherein building the backup tunnel comprises building backup tunnels around each of the neighbor node's possible successors.

8. The method of claim 1 wherein transmitting said request message comprises transmitting said request message to one or more neighbor nodes that are not Enhanced Interior Gateway Routing Protocol (EIGRP) successor neighbors.

9. The method of claim 1 wherein said reply message is generated at a router that is configured to forward network traffic to the destination through a neighbor node that conforms to the following constraints:
   the neighbor node is not the node from which the router received said request message; and
   the neighbor node is not the node to be avoided.

10. The method of claim 9 wherein the router has a path to the destination comprising a cost less than or equal to said request cost.

11. The method of claim 1 wherein said request cost comprises a cost from the node to be avoided to the destination.

12. An apparatus comprising:
   a processor configured to identify a destination for which a primary path is defined between the apparatus and the destination, transmit a request message to a neighbor node for routing information for a backup path between the node and the destination, said request message comprising at least one node identified as a node to be avoided in said backup path and a request cost, process a reply message comprising an address identifying said backup path, and build a backup tunnel to said address; and
   memory for storing said primary path and said backup path.

13. The apparatus of claim 12 wherein said request message comprises an Enhanced Interior Gateway Routing Protocol (EIGRP) message.

14. The apparatus of claim 12 wherein said address identifies an interface of a node generating said reply message.

15. The apparatus of claim 12 wherein the destination comprises all destinations through a neighbor node.

16. The apparatus of claim 15 wherein the processor is configured to build one of the backup tunnels around each of the neighbor node's possible successors.

17. The apparatus of claim 12 wherein said request messages are configured to be transmitted to one or more neighbor nodes that are not Enhanced Interior Gateway Routing Protocol (EIGRP) successor neighbors.

18. The apparatus of claim 12 wherein said reply message is generated at a router that is configured to forward network traffic to the destination through a neighbor node that conforms to the following constraints:
   the neighbor node is not the node from which the router received said request message; and
   the neighbor node is not the node to be avoided.

19. The apparatus of claim 18 wherein the router has a path to the destination comprising a cost less than or equal to said request cost.

20. An apparatus, comprising:
   means for identifying at a node, a destination for which a primary path is defined between the node and the destination;
   means for transmitting from the node, a request message to a neighbor node for routing information for a backup path between the node and the destination, said request message comprising at least one node identified as a node to be avoided in said backup path and a request cost;
   means for receiving at the node, a reply message comprising an address identifying said backup path; and
   means for building a backup tunnel to said address.

* * * * *